US010492216B2

(12) United States Patent
Qiang et al.

(10) Patent No.: US 10,492,216 B2
(45) Date of Patent: Nov. 26, 2019

(54) METHOD AND BS FOR SCHEDULING UE, AND METHOD AND UE FOR TRANSMITTING HARQ

(71) Applicant: Telefonaktiebolaget LM Ericsson (publ), Stockholm (SE)

(72) Inventors: Yongquan Qiang, Beijing (CN); Feng Li, Beijing (CN); Huaisong Zhu, Beijing (CN); Huichun Liu, Beijing (CN); Jingyue Nie, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 221 days.

(21) Appl. No.: 15/511,053

(22) PCT Filed: Sep. 24, 2014

(86) PCT No.: PCT/CN2014/087296
§ 371 (c)(1),
(2) Date: Mar. 14, 2017

(87) PCT Pub. No.: WO2016/045011
PCT Pub. Date: Mar. 31, 2016

(65) Prior Publication Data
US 2017/0251491 A1 Aug. 31, 2017

(51) Int. Cl.
*H04W 4/00* (2018.01)
*H04W 72/12* (2009.01)
(Continued)

(52) U.S. Cl.
CPC .......... *H04W 72/1284* (2013.01); *H04L 1/00* (2013.01); *H04L 1/1812* (2013.01);
(Continued)

(58) Field of Classification Search
CPC ....... H04L 1/0026; H04L 1/0077; H04L 1/06; H04L 1/08; H04L 1/1891; H04L 1/1607;
(Continued)

(56) References Cited

U.S. PATENT DOCUMENTS

2013/0155914 A1* 6/2013 Wang ................. H04L 5/001
370/280
2013/0195066 A1* 8/2013 Lee .................... H04W 52/04
370/329
(Continued)

FOREIGN PATENT DOCUMENTS

CN 103188062 A 7/2013
CN 103368709 A 10/2013
(Continued)

OTHER PUBLICATIONS

Unknown, Author, "Discussion on HARQ-ACK Resource in TDD eIMTA Systems", 3GPP TSG-RAN WG1 Meeting #74bis, R1-134435, MediaTek Inc., Guangzhou, China, Oct. 7-11, 2013, 3 pages.
(Continued)

*Primary Examiner* — Un C Cho
*Assistant Examiner* — Rasha K Fayed
(74) *Attorney, Agent, or Firm* — Sage Patent Group (57) ABSTRACT

The present disclosure relates to a method used in a BS for scheduling a UE, and an associated BS. The method includes: determining four sets of PUCCH format 1b with channel selection resources, which include a part of CCE-mapped dynamic HARQ feedback resources reserved for the UE transmitting HARQ feedback to the BS by using PUCCH format 1a/1b, each set including two PUCCH format 1b with channel selection resources; selecting one of the four sets of PUCCH format 1b with channel selection resources as candidate resources, which are available for the UE transmitting HARQ feedback to the BS by using
(Continued)

DYNAMIC HARQ FEEDBACK AND HARQ FEEDBACK WITH CHANNEL SELECTION

DYNAMIC HARQ FEEDBACK

PUCCH format 1b with channel selection; and transmitting to the UE an indication indicating the selected one of the four sets of PUCCH format 1b with channel selection resources. The present disclosure also relates to a method used in a UE for transmitting HARQ feedback to a BS by using PUCCH format 1b with channel selection, and an associated UE.

14 Claims, 5 Drawing Sheets

(51) Int. Cl.
    *H04L 1/00*               (2006.01)
    *H04W 72/02*           (2009.01)
    *H04L 1/18*              (2006.01)
    *H04L 5/00*              (2006.01)
    *H04W 28/26*           (2009.01)
    *H04W 88/02*           (2009.01)
    *H04W 88/08*           (2009.01)

(52) U.S. Cl.
    CPC .......... *H04L 1/1861* (2013.01); *H04L 1/1896* (2013.01); *H04L 5/0055* (2013.01); *H04W 72/02* (2013.01); *H04W 28/26* (2013.01); *H04W 72/1289* (2013.01); *H04W 88/02* (2013.01); *H04W 88/08* (2013.01)

(58) Field of Classification Search
    CPC ... H04L 1/1854; H04L 1/1893; H04L 1/1671; H04L 1/1887; H04L 1/0061; H04L 1/1614; H04L 1/1864; H04L 1/1858; H04L 1/1635; H04L 5/001; H04L 5/0053; H04L 5/0055; H04L 5/0048; H04L 5/0007; H04L 5/008; H04L 5/0094; H04L 5/14; H04L 5/0037; H04L 5/0023; H04L 5/0035; H04L 5/0044; H04L 25/03; H04L 12/1407; H04L 47/12; H04L 47/38; H04L 27/2636; H04L 2001/125; H04W 4/00; H04W 72/0413; H04W 72/042; H04W 72/0406; H04W 72/0446; H04W 72/04; H04W 72/044; H04W 72/02; H04W 76/27; H04W 24/10; H04W 52/04
    USPC ................................. 370/329, 280, 328, 335
    See application file for complete search history.

(56) References Cited

U.S. PATENT DOCUMENTS

| | | | |
|---|---|---|---|
| 2013/0208633 A1 | 8/2013 | Gao et al. | |
| 2013/0242923 A1* | 9/2013 | Yang ..................... | H04L 1/1825 370/329 |
| 2013/0308550 A1* | 11/2013 | Yin ......................... | H04L 5/001 370/329 |
| 2014/0092865 A1* | 4/2014 | Heo ......................... | H04W 4/70 370/331 |
| 2014/0126491 A1* | 5/2014 | Ekpenyong ........... | H04L 5/0055 370/329 |
| 2015/0016311 A1* | 1/2015 | Han ....................... | H04W 24/10 370/280 |
| 2015/0092693 A1* | 4/2015 | Fu ........................... | H04L 5/001 370/329 |
| 2015/0117272 A1* | 4/2015 | Gao ....................... | H04L 1/1861 370/280 |

FOREIGN PATENT DOCUMENTS

| | | |
|---|---|---|
| CN | 103378954 A | 10/2013 |
| CN | 103582008 A | 2/2014 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 1-125.

* cited by examiner

HARQ Feedback with Channel Selection

Dynamic HARQ feedback

HARQ Feedback with Channel Selection

Dynamic HARQ feedback and HARQ Feedback with Channel Selection

METHOD AND BS FOR SCHEDULING UE, AND METHOD AND UE FOR TRANSMITTING HARQ

TECHNICAL FIELD

The technology presented in this disclosure generally relates to radio communication networks. More particularly, the present disclosure relates to a method used in a Base Station (BS) for scheduling a User Equipment (UE) and an associated BS, and to a method used in a UE for transmitting Hybrid Automatic Repeat Request (HARQ) feedback to a BS by using Physical Uplink Control CHannel (PUCCH) format 1b with channel selection and an associated UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In general, control signaling information carried on PUCCH (also referred to as Uplink Control Information (UCI)) includes:

Scheduling Requests (SRs);
dynamic HARQ feedback (ACK/NACK) in response to downlink data packets on Physical Downlink Shared CHannel (PDSCH); and
Channel Quality Indicator (CQI), which for the purposes of control signaling categorization.

In the Long-Term Evolution (LTE) system, the PUCCH supports seven different formats depending on UCI to be signaled. The mapping between PUCCH formats and corresponding UCI supported in LTE is shown in the following Table 1.

TABLE 1

Supported uplink control information formats on PUCCH

| PUCCH Format | UCI |
|---|---|
| Format 1 | SR (un-modulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Some Physical Resource Blocks (PRBs) in UpLink (UL) are reserved as PUCCH for CQI, SR and dynamic HARQ ACK/NACK feedback. Resources for the dynamic HARQ feedback are Control Channel Element (CCE)-mapped according to the maximum number of CCEs and the ACK/NACK bundling window size with assumption that every CCE is assigned to a different user which needs a corresponding HARQ feedback resource. For example, a resource index for the dynamic HARQ ACK/NACK feedback is implicitly determined based on the index of the first Control Channel Element (CCE) of the downlink control assignment as:

$$n_{PUCCH}^{(1)} = (M-m-1) \times N_p + m \times N_{p+1} + n_{CCE} + N_{PUCCH}^{(1)} \quad (1)$$

where $n_{CCE}$ is the number of the first CCE used for transmission of the corresponding PDCCH in subframe $n-k_m$, where $k_m$ is the smallest value in set K such that UE detects a PDCCH in subframe $n-k_m$ (see, e.g., 3GPP TS 36.213 V10.4.0).

In view of this, resources for the UE transmitting the dynamic HARQ feedback in PUCCH format 1a/1b may be referred to as CCE-mapped dynamic HARQ feedback resources. However, in the real systems, the number of scheduled users is limited and CCE aggregation level is not always equal to 1. That means that the CCE-mapped dynamic HARQ feedback resources might be over-reserved, thereby resulting in ineffectiveness.

With introduction of carrier aggregation in the LTE-advanced (LTE-A) system, a PUCCH format 1b with channel selection is defined in Release 10 for supporting carrier aggregation (see 3GPP TS 36.213 V10.4.0). A UE that supports carrier aggregation at most 2 serving cells shall use PUCCH format 1b with channel selection for transmission of HARQ-ACK (HARQ feedback including ACK/NACK). The PUCCH format 1b with channel selection requires more PUCCH format 1b resources. To be specific, in carrier aggregation with 2 serving cells, the PUCCH format 1b with channel selection is adopted for DownLink (DL) HARQ feedback. In each UL PUCCH transmission, one of 4 PUCCH format 1 b resources (channels) is selected to transmit HARQ feedback. Thus, 4 (channels)×2 (format 1 b bits)=16 feedback states (4 HARQ bits) can be reported in each UL PUCCH transmission. Usually, the first two PUCCH format 1b resources are determined according to $n_{CCE}$ and $n_{CCE}+1$ mapped dynamic HARQ feedback resources. The last two PUCCH format 1b resources are assigned dynamically in each DL assignment by selecting one of 4 pre-configured channel selection resource sets. Each channel selection resource sets contains two PUCCH format 1b resources.

Figure 1:
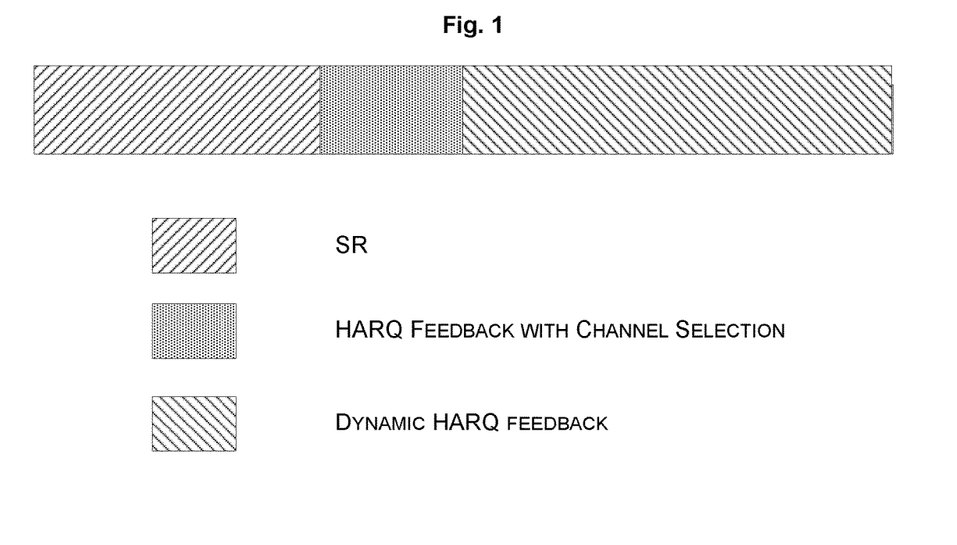
FIG. 1 illustrates a typical PUCCH resource allocation.

Usually, PUCCH resources reserved for SR are used for the PUCCH format 1b with channel selection, as illustrated in FIG. 1. As shown, the PUCCH format 1b with channel selection resources are non-overlapped with dynamic HARQ feedback resources. With a given number of PUCCH format 1/1a/1b PRBs, the total number of PRBs for SR is decreased (e.g., 8 SR users per UL subframe is occupied), thereby resulting in significant degradation of system capacity due to SR reduction. Alternatively, more PUCCH PRBs need to be reserved to guarantee the SR capacity, which results in UL throughput degradation.

SUMMARY

It is in view of the above considerations and others that the various embodiments of the present technology have been made. To be specific, aiming to at least some of the above defects, the present disclosure proposes to reuse resources, which are reserved for the UE transmitting dynamic HARQ feedback to the BS by using PUCCH format 1a/1b, for the UE transmitting HARQ feedback by using PUCCH format 1b with channel selection.

According to a first aspect of the present disclosure, there is proposed a method used in a BS for scheduling a UE. The method includes: determining four sets of PUCCH format 1b with channel selection resources, which include a part of CCE-mapped dynamic HARQ feedback resources reserved for the UE transmitting HARQ feedback to the BS by using PUCCH format 1a/1b, each set including two PUCCH format 1b with channel selection resources; selecting one of the four sets of PUCCH format 1b with channel selection resources as candidate resources, which are available for the UE transmitting HARQ feedback to the BS by using PUCCH format 1b with channel selection; and transmitting to the UE an indication indicating the selected one of the four sets of PUCCH format 1b with channel selection resources.

According to a second aspect of the present disclosure, there is proposed a method used in a UE for transmitting HARQ feedback to a BS by using PUCCH format 1b with channel selection. The method includes: receiving, from the BS, an indication indicating a set of PUCCH format 1b with channel selection resources among four sets of PUCCH format 1b with channel selection resources, which include a part of CCE-mapped dynamic HARQ feedback resources reserved for the UE transmitting HARQ feedback to the BS by using PUCCH format 1a/1b, each set including two PUCCH format 1b with channel selection resources; determining two PUCCH format 1b with channel selection resources based on a CCE index allocated to the UE; selecting, from the set of PUCCH format 1b with channel selection resources indicated by the received indication and the determined two PUCCH format 1b with channel selection resources, a PUCCH format 1b with channel selection resource; and transmitting the HARQ feedback to the BS by using the selected PUCCH format 1b with channel selection resource.

According to a third aspect of the present disclosure, there is proposed a BS for scheduling a UE. The BS includes: a determining unit configured to determine four sets of PUCCH format 1b with channel selection resources, which include a part of CCE-mapped dynamic HARQ feedback resources reserved for the UE transmitting HARQ feedback to the BS by using PUCCH format 1a/1b, each set including two PUCCH format 1b with channel selection resources; a selecting unit configured to select one of the four sets of PUCCH format 1b with channel selection resources as candidate resources, which are available for the UE transmitting HARQ feedback to the BS by using PUCCH format 1b with channel selection; and a transmitting unit configured to transmit to the UE an indication indicating the selected one of the four sets of PUCCH format 1b with channel selection resources.

According to a fourth aspect of the present disclosure, there is proposed a UE for transmitting HARQ feedback to a BS by using PUCCH format 1b with channel selection. The UE includes: a receiving unit configured to receive, from the BS, an indication indicating a set of PUCCH format 1b with channel selection resources among four sets of PUCCH format 1b with channel selection resources, which include a part of CCE-mapped dynamic HARQ feedback resources reserved for the UE transmitting HARQ feedback to the BS by using PUCCH format 1a/1b, each set including two PUCCH format 1b with channel selection resources; a determining unit configured to determine two PUCCH format 1b with channel selection resources based on a CCE index allocated to the UE; a selecting unit configured to select, from the set of PUCCH format 1b with channel selection resources indicated by the received indication and the determined two PUCCH format 1b with channel selection resources, a PUCCH format 1b with channel selection resource; and a transmitting unit configured to transmit the HARQ feedback to the BS on the selected PUCCH format 1b with channel selection resource.

According to a fifth aspect of the present disclosure, there is proposed a computer program product storing instructions that when executed, cause one or more computing devices to perform the method according to any of the first to the fourth aspects of the present disclosure.

By reusing all or part of CCE-mapped dynamic HARQ feedback resources, which are reserved for the UE transmitting HARQ feedback to the BS by using PUCCH format 1a/1b, as resources for the UE transmitting HARQ feedback to the BS by using PUCCH format 1b with channel selection, the present disclosure can save PUCCH resources for SR while improving UL throughput.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, a PDA, a portal computer etc. Yet further, the term UE includes MTC (Machine Type Communication) devices, which do not necessarily involve human interaction. Also, the term "BS" as used herein may be referred to as a radio base station, a NodeB or an evolved NodeB (eNB), access point, relay node, etcetera.

As mentioned above, PUCCH format 1b with channel selection is newly introduced in the LTE-A system as a new format other than PUCCH format 1a/1b, and is also used for signaling of HARQ feedback (ACK/NACK).

The present disclosure proposes a solution of using some resources, which are reserved for the UE transmitting dynamic HARQ feedback to the BS by using PUCCH format 1a/1b, for the UE transmitting HARQ feedback by using PUCCH format 1b with channel selection.

Figure 2:
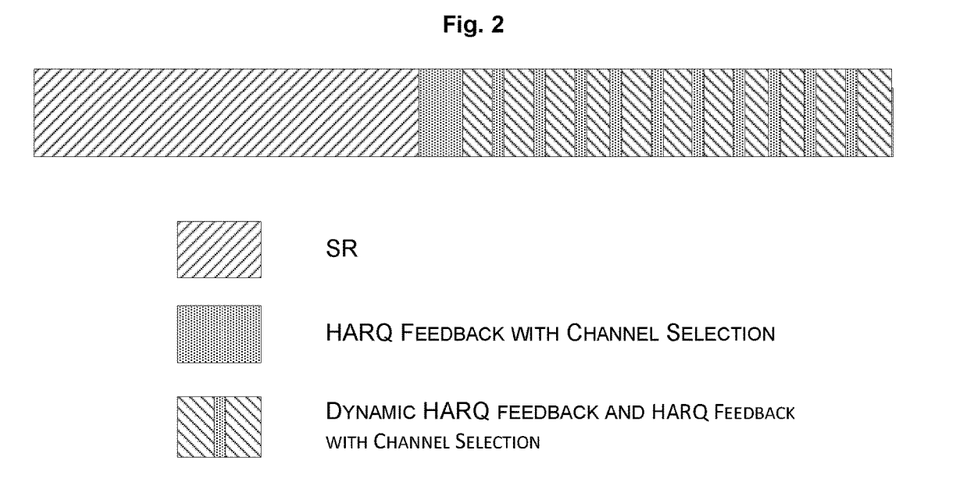
FIG. 2 shows a schematic diagram illustrating a general PUCCH resource allocation according to the present disclosure.

FIG. 2 shows a schematic diagram illustrating a general PUCCH resource allocation for SR, dynamic HARQ feedback and PUCCH format 1b with channel selection according to the present disclosure. As illustrated in FIG. 2, some of CCE-mapped dynamic HARQ feedback resources reserved for the UE transmitting dynamic HARQ feedback to the BS by using PUCCH format 1a/1b are reused for the UE transmitting HARQ feedback by using PUCCH format 1b with channel selection.

By doing so, the present disclosure does not need to occupy PUCCH resources for SR, thereby saving the PUCCH resources for SR while securing system capacity.

Figure 3:
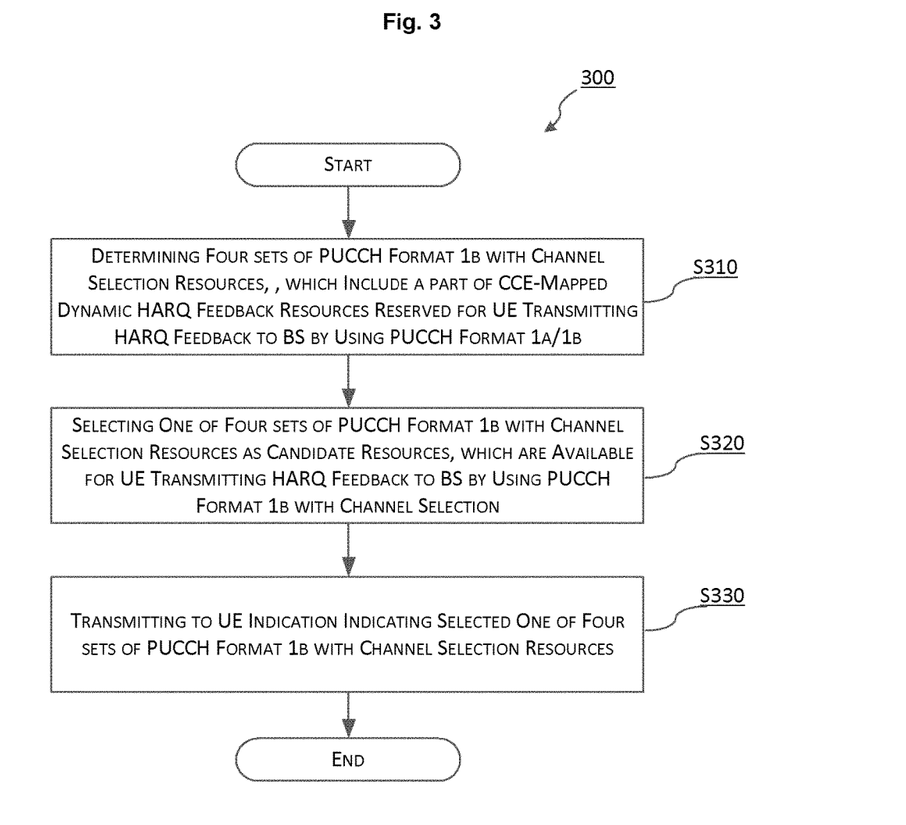
FIG. 3 shows a flowchart of a method 300 used in a BS for scheduling a UE according to the present disclosure.

FIG. 3 shows a flowchart of a method 300 used in a BS for scheduling a UE according to the present disclosure.

At step S310, the BS determines four sets of PUCCH format 1b with channel selection resources, which include a part of CCE-mapped dynamic HARQ feedback resources reserved for the UE transmitting HARQ feedback to the BS by using PUCCH format 1a/1b. Each set includes two PUCCH format 1b with channel selection resources.

At step S320, the BS selects one of the four sets of PUCCH format 1b with channel selection resources as candidate resources, which are available for the UE transmitting HARQ feedback to the BS by using PUCCH format 1b with channel selection.

Herein, the part of the CCE-mapped dynamic HARQ feedback resources can be used not only in the UE transmitting HARQ feedback to the BS by using PUCCH format 1a/1b, but also in the UE transmitting HARQ feedback to the BS by using PUCCH format 1b with channel selection. That is, the part of the CCE-mapped dynamic HARQ feedback resources can be shared by these two scenarios, but not used simultaneously. In practice, if the part of the CCE-mapped dynamic HARQ feedback resources is being used in either of these two scenarios, it cannot be used in the other scenario.

At step S330, the BS transmits to the UE an indication indicating the selected one of the four sets of PUCCH format 1b with channel selection resources.

In an implementation, the four sets of PUCCH format 1b with channel selection resources further include HARQ feedback resources dedicated for the PUCCH format 1b with channel selection.

As illustrated in FIG. 2, candidate resources for the PUCCH format 1b with channel selection may include HARQ feedback resources dedicated for the PUCCH format 1b with channel selection and a part of the CCE-mapped dynamic HARQ feedback resources. That is, although the illustrated part of CCE-mapped dynamic HARQ feedback resources is reserved for the UE transmitting HARQ feedback to the BS by using PUCCH format 1a/1b, it can be used for the UE transmitting HARQ feedback to the BS by using PUCCH format 1b with channel selection, other than transmitting HARQ feedback to the BS by using PUCCH format 1a/1b.

Alternatively, all of the CCE-mapped dynamic HARQ feedback resources may be also used as candidate resources for the PUCCH format 1b with channel selection.

That is, all of the CCE-mapped dynamic HARQ feedback resources can be shared between the UE transmitting HARQ feedback to the BS by using PUCCH format 1b with channel selection and the UE transmitting HARQ feedback to the BS by using PUCCH format 1a/1b.

In another implementation, the CCE-mapped dynamic HARQ feedback resources can be reserved statically and reused dynamically for the PUCCH format 1b with channel selection.

Figure 4:
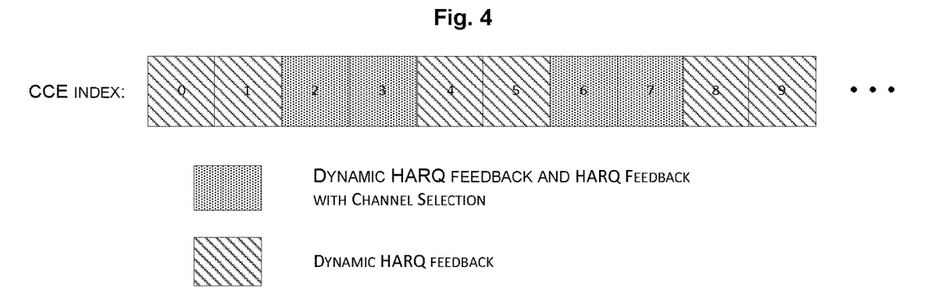
FIG. 4 shows a schematic diagram illustrating an exemplary PUCCH resource allocation for dynamic HARQ feedback and PUCCH format 1b with channel selection in terms of corresponding CCE indices.

FIG. 4 shows a schematic diagram illustrating an exemplary PUCCH resource allocation for dynamic HARQ feedback and PUCCH format 1b with channel selection in terms of corresponding CCE indices. As shown in FIG. 4, CCE index 0 and CCE index 1 are used for only the dynamic HARQ feedback, CCE index 2 and CCE index 3 are shared by the dynamic HARQ feedback and the PUCCH format 1b with channel selection, and so on. That is, the part of the CCE-mapped dynamic HARQ feedback resources reused for the PUCCH format 1b with channel selection are indicated by every two adjacent CCE indices allocated to the UE.

By using such an assignment, there is no collision between dynamic HARQ resources and channel selection, in case of CCE allocation with aggregation level 4 or 8. To be specific, in case of CCE assignment with aggregation level 4 or 8, there is no collision between dynamic HARQ resources and the PUCCH format 1b with channel selection. For instance, for CCE aggregation level 4, the possible CCE staring index is 0, 4, 8, . . . , and the first or second CCE-mapped dynamic HARQ feedback resource is occupied by the dynamic HARQ feedback. Thus, the remained CCE-mapped dynamic HARQ feedback resources can be used freely for the PUCCH format 1b with channel selection. In case of CCE aggregation level 8, the PUCCH resources mapped with CCE index 2/3/6/7 will not be used for the dynamic HARQ feedback, and can be used freely for the PUCCH format 1b with channel selection.

In the following, several examples will be discussed to illustrate how to specifically assign the part of the CCE-mapped dynamic HARQ feedback resources, which are shared between the UE transmitting HARQ feedback to the BS by using PUCCH format 1b with channel selection and the UE transmitting HARQ feedback to the BS by using PUCCH format 1a/1b, depending on requirements of different UEs. This is because not all UEs need to transmit HARQ feedback to the BS by using PUCCH format 1a/1b. That is, there are some UEs, which do not have HARQ feedback transmitted to the BS by using PUCCH format 1a/1b.

For sake of explanations, first of all, CCE search space may be divided into two groups, i.e., a first CCE search space and a second CCE search space. CCE-mapped dynamic HARQ feedback resources corresponding to first CCE search space are the dedicated for dynamic HARQ feedback, and cannot be used for the PUCCH format 1b with channel selection. CCE-mapped dynamic HARQ feedback resources corresponding to the second CCE search space are shared for the dynamic HARQ feedback and the PUCCH format 1b with channel selection. That is, the CCE-mapped dynamic HARQ feedback resources corresponding to the second CCE search space can be used for either the dynamic HARQ feedback or the PUCCH format 1b with channel selection.

In the first example, for UEs, which have no HARQ feedback transmitted to the BS by using PUCCH format 1a/1b (e.g., SCell DL UEs, UL UEs), the part of the CCE-mapped dynamic HARQ feedback resources reserved for the UE transmitting HARQ feedback to the BS by using PUCCH format 1a/1b is assigned, proceeding the remaining part, to the UEs.

In the second example, for UEs, which have HARQ feedback transmitted to the BS by using PUCCH format 1a/1b (e.g., DL PCell UEs), the part of the CCE-mapped dynamic HARQ feedback resources reserved for the UE transmitting HARQ feedback to the BS by using PUCCH format 1a/1b is assigned, inferior to the remaining part, to the UEs.

In the third example, for UEs, which have HARQ feedback transmitted to the BS by using PUCCH format 1a/1b, the part of the CCE-mapped dynamic HARQ feedback resources reserved for the UE transmitting HARQ feedback to the BS by using PUCCH format 1a/1b and the remaining part are freely assigned to the UEs.

Herein, a procedure of reserving PUCCH resources is called as CCE allocation, and a procedure of assigning some of the CCE-mapped dynamic HARQ feedback resources to the PUCCH format 1b with channel selection is called as channel selection allocation. In accordance with the present disclosure, CCE allocation is done first, and then channel selection allocation is performed.

In the following, exemplary procedures for CCE allocation and channel selection may be described as follows.

Figure 5:
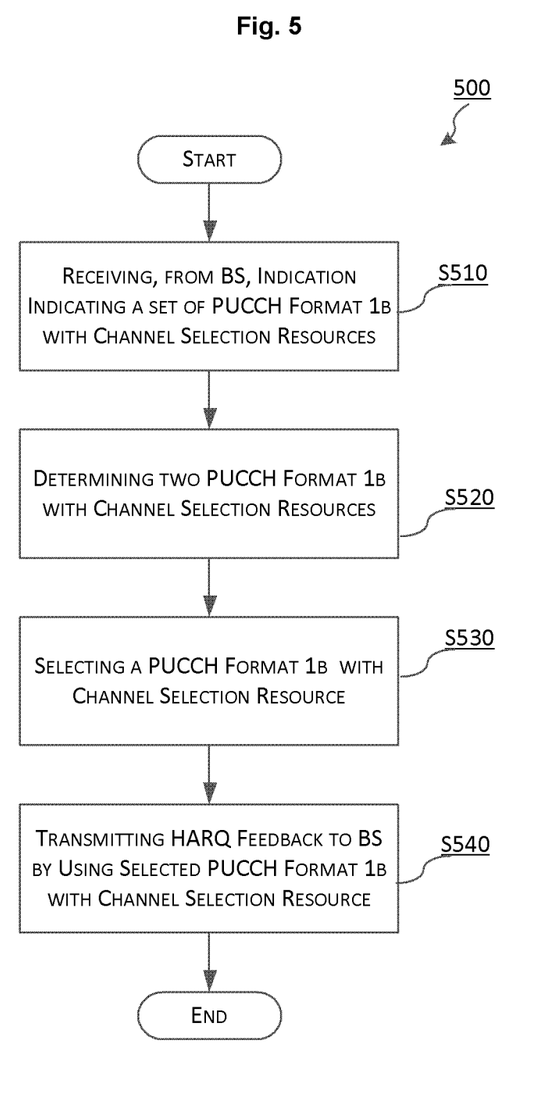
FIG. 5 shows a flowchart of a method 500 used in a UE for transmitting HARQ feedback to a BS by using PUCCH format 1b with channel selection according to the present disclosure.

CCE Allocation:

FIG. 5 shows a flowchart of a method 500 used in a UE for transmitting HARQ feedback to a BS by using PUCCH format 1b with channel selection according to the present disclosure.

At step S510, the UE receives, from the BS, an indication indicating a set of PUCCH format 1b with channel selection resources among four sets of PUCCH format 1b with channel selection resources, which include a part of CCE-mapped dynamic HARQ feedback resources reserved for the UE transmitting HARQ feedback to the BS by using PUCCH format 1a/1b. Each set includes two PUCCH format 1b with channel selection resources.

At step S520, the UE determines two PUCCH format 1b with channel selection resources based on a CCE index allocated to the UE.

At step S530, the UE selects, from the set of PUCCH format 1b with channel selection resources indicated by the received indication and the determined two PUCCH format 1b with channel selection resources, a PUCCH format 1b with channel selection resource.

At step S540, the UE transmits the HARQ feedback to the BS by using the selected PUCCH format 1b with channel selection resource.

In an implementation, the four sets of PUCCH format 1b with channel selection resources further include HARQ feedback resources dedicated for the PUCCH format 1b with channel selection.

In another implementation, the part of CCE-mapped dynamic HARQ feedback resources are indicated by every two adjacent CCE indices allocated to the UE.

Figure 6:
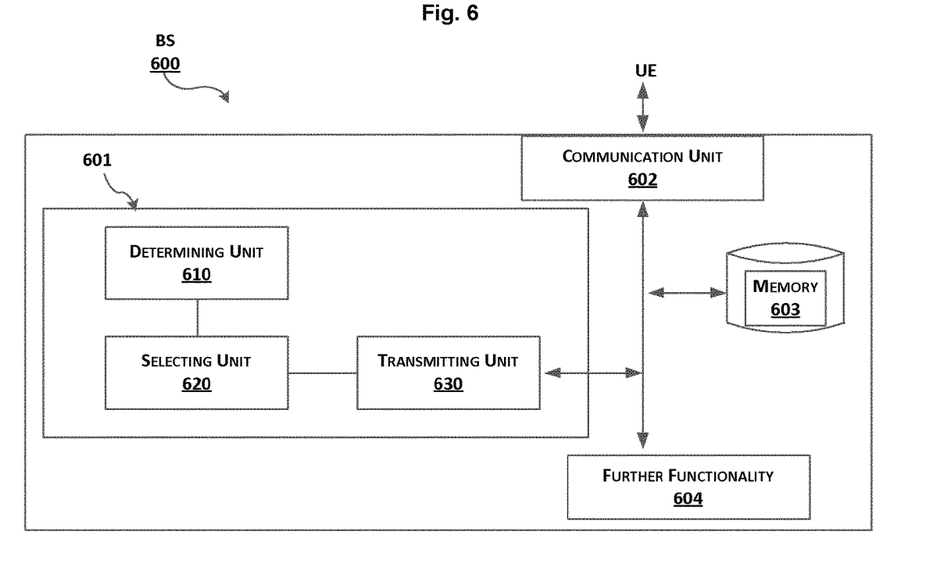
FIG. 6 is a schematic block diagram of a BS 600 for scheduling a UE according to the present disclosure.

FIG. 6 is a schematic block diagram of a BS 600 for scheduling a UE according to the present disclosure.

```
If (UE needs CCE-mapped HARQ Resources && CCE Aggregation Level == 1 or
2)
    Loop the first CCE search space for CCE allocation.
    If CCE allocation is failed in the first search space
        Loop the second search space for further attempts of CCE
        allocation.
        If CCE allocation success and two CCE-mapped resources
        required for HARQ feedback
            Mark the first and second CCE mapped resources as
            unavailable for channel selection.
        Else if CCE allocation success and one CCE-mapped
        resource required
            Mark the first CCE mapped resource as unavailable for
            channel selection.
        End if
    End if
Else if (UE doesn't needs CCE-mapped HARQ Resources && CCE Aggregation
Level == 1 or 2) //e.g. SCell UEs and UL UEs.
    Loop the second search space for CCE allocation first.
    If CCE allocation is failed in the second search space, loop the first
    search space for further attempts of CCE allocation
Else //e.g. CCE aggregation level 4 or 8
    Free search space selection for CCE allocation.
End if
```

Channel Selection Allocation:

```
Loop the pre-configured channel selection sets for each UE
    If every resource of channel selection set is available for
    allocation
        Assign the channel selection set to UE and
        mark as unavailable.
    End if
End loop
```

The part of BS 600 which is most affected by the adaptation to the herein described method, e.g., the method 300, is illustrated as an arrangement 601, surrounded by a dashed line. The BS 600 could be e.g. an eNB, or a NodeB, depending on in which type of communication system it is operable, e.g., LTE-A-type systems. The BS 600 and arrangement 601 may be further configured to communicate with other entities via a communication unit 602 which may be regarded as part of the arrangement 601. The communication unit 602 comprises means for wireless communication, and may comprise means for, e.g., wired communication. The arrangement 601 or BS 600 may further comprise other functional units 604, such as functional units providing regular BS functions, and may further comprise one or more storage units (memories) 603.

The arrangement 601 may be implemented, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3. The arrangement part of the BS 600 may be implemented and/or described as follows.

Referring to FIG. 6, BS 600 includes a determining unit 610, a selecting unit 620, and a transmitting unit 630.

The determining unit 610 is configured to determine four sets of PUCCH format 1b with channel selection resources, which include a part of CCE-mapped dynamic HARQ feedback resources reserved for the UE transmitting HARQ feedback to the BS by using PUCCH format 1a/1b. Each set includes two PUCCH format 1b with channel selection resources.

In an implementation, the four sets of PUCCH format 1b with channel selection resources further include HARQ feedback resources dedicated for the PUCCH format 1b with channel selection.

In another implementation, the part of CCE-mapped dynamic HARQ feedback resources are indicated by every two adjacent CCE indices allocated to the UE.

The selecting unit 620 is configured to select one of the four sets of PUCCH format 1b with channel selection resources as candidate resources, which are available for the UE transmitting HARQ feedback to the BS by using PUCCH format 1b with channel selection.

The transmitting unit 630 is configured to transmit to the UE an indication indicating the selected one of the four sets of PUCCH format 1b with channel selection resources.

In an implementation, the part of the CCE-mapped dynamic HARQ feedback resources reserved for the UE transmitting HARQ feedback to the BS by using PUCCH format 1a/1b is assigned, proceeding the remaining part, to UEs, which have no HARQ feedback transmitted to the BS by using PUCCH format 1a/1b.

In another implementation, the part of the CCE-mapped dynamic HARQ feedback resources reserved for the UE transmitting HARQ feedback to the BS by using PUCCH format 1a/1b is assigned, inferior to the remaining part, to UEs, which have HARQ feedback transmitted to the BS by using PUCCH format 1a/1b.

In yet another implementation, the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b.

It should be noted that two or more different units in this disclosure may be logically or physically combined. For example, the determining unit 610 and the selecting unit 620 may be combined as one single unit.

Figure 7:
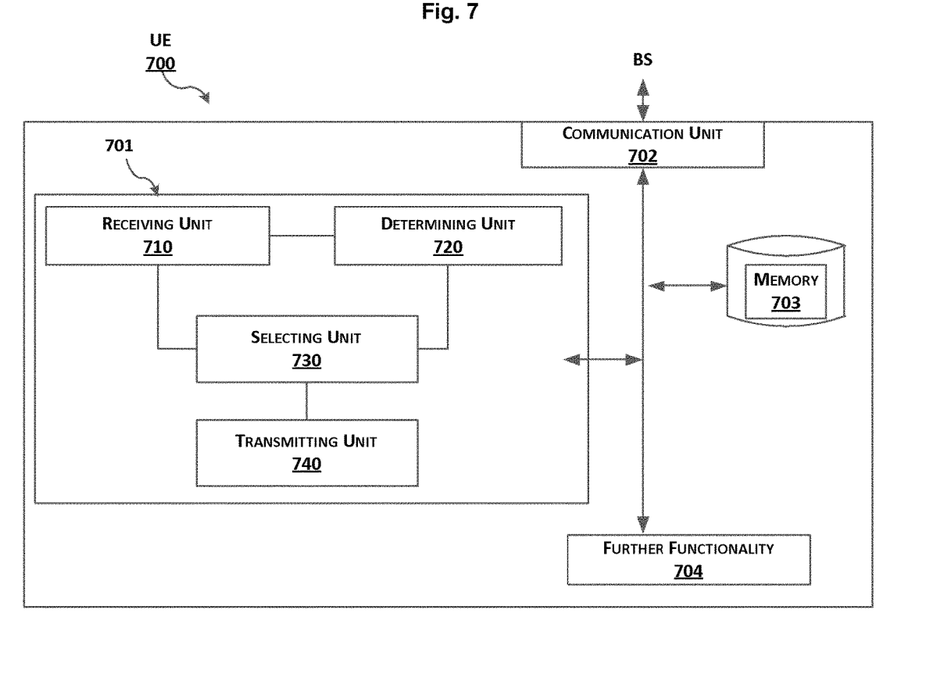
FIG. 7 is a schematic block diagram of a UE 700 for transmitting HARQ feedback to a BS by using PUCCH format 1b with channel selection according to the present disclosure.

FIG. 7 is a schematic block diagram of a UE 700 for transmitting HARQ feedback to a BS by using PUCCH format 1b with channel selection according to the present disclosure.

The part of UE 700 which is most affected by the adaptation to the herein described method, e.g., the method 500, is illustrated as an arrangement 701, surrounded by a dashed line. The UE 700 could be, e.g., a mobile terminal, depending on in which type of communication system it is operable, e.g., LTE-type systems or WCDMA-type systems. The UE 700 and arrangement 701 may be further configured to communicate with other entities via a communication unit 702 which may be regarded as part of the arrangement 701. The communication unit 702 comprises means for wireless communication. The arrangement 701 or UE 700 may further comprise other functional units 704, such as functional units providing regular UE functions, and may further comprise one or more storage units (memories) 703.

The arrangement 701 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 5. The arrangement part of the UE 700 may be implemented and/or described as follows.

Referring to FIG. 7, UE 700 includes a receiving unit 710, a determining unit 720, a selecting unit 730, and a transmitting unit 740.

The receiving unit 710 is configured to receive, from the BS, an indication indicating a set of PUCCH format 1b with channel selection resources among four sets of PUCCH format 1b with channel selection resources, which include a part of CCE-mapped dynamic HARQ feedback resources reserved for the UE transmitting HARQ feedback to the BS by using PUCCH format 1a/1b. Each set includes two PUCCH format 1b with channel selection resources.

In an implementation, the four sets of PUCCH format 1b with channel selection resources further include HARQ feedback resources dedicated for the PUCCH format 1b with channel selection.

In another implementation, the part of CCE-mapped dynamic HARQ feedback resources are indicated by every two adjacent CCE indices allocated to the UE.

The determining unit 720 is configured to determine two PUCCH format 1b with channel selection resources based on a CCE index allocated to the UE.

The selecting unit 730 is configured to select, from the set of PUCCH format 1b with channel selection resources indicated by the received indication and the determined two PUCCH format 1b with channel selection resources, a PUCCH format 1b with channel selection resource.

The transmitting unit 740 is configured to transmit the HARQ feedback to the BS on the selected PUCCH format 1b with channel selection resource.

It should be noted that two or more different units in this disclosure may be logically or physically combined. For example, the receiving unit 710 and the transmitting unit 740 may be combined as one single unit.

Figure 8:
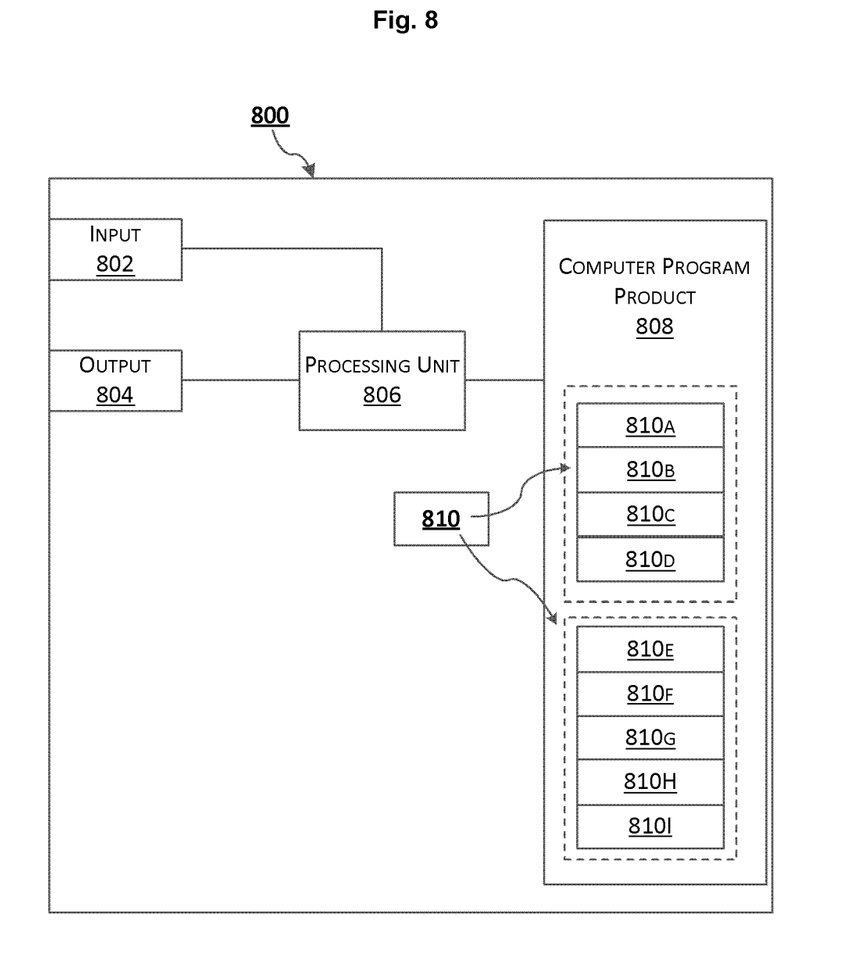
FIG. 8 schematically shows an embodiment of an arrangement 800 which may be used in the BS 600 or the UE 700 according to the present disclosure.

FIG. 8 schematically shows an embodiment of an arrangement 800 which may be used in the BS 600 or the UE 700 according to the present disclosure. Comprised in the arrangement 800 are here a processing unit 806, e.g., with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit and the output unit may be arranged as an integrated entity or as illustrated in the example of FIG. 6 or FIG. 7.

Furthermore, the arrangement 800 may comprise at least one computer program product 808 in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processing unit 806 in the arrangement 800 causes the arrangement 800 and/or the BS or the UE in which it is comprised to perform the actions, e.g., of the procedure described earlier in conjunction with FIG. 3 or FIG. 5.

The computer program 810 may be configured as a computer program code structured in computer program modules 810A-810D or 810E-810I.

Hence, in an exemplifying embodiment when the arrangement 800 is used in the BS 600, the code in the computer program of the arrangement 800 includes a determining module 810A, for determining four sets of PUCCH format 1b with channel selection resources, which include a part of CCE-mapped dynamic HARQ feedback resources reserved for the UE transmitting HARQ feedback to the BS by using PUCCH format 1a/1b, wherein each set includes two PUCCH format 1b with channel selection resources. The code in the computer program 810 further includes a selecting module 810B, for selecting one of the four sets of PUCCH format 1b with channel selection resources as candidate resources, which are available for the UE transmitting HARQ feedback to the BS by using PUCCH format 1b with channel selection. The code in the computer program 810 further includes a transmitting module 810C, for transmitting to the UE an indication indicating the selected one of the four sets of PUCCH format 1b with channel selection resources. The code in the computer program 810 may comprise further modules, illustrated as module 810D, e.g. for controlling and performing other related procedures associated with BS's operations.

In another exemplifying embodiment when the arrangement 800 is used in the UE 700, the code in the computer program of the arrangement 800 includes a receiving module 810E, for receiving, from the BS, an indication indicating a set of PUCCH format 1b with channel selection resources among four sets of PUCCH format 1b with channel selection resources, which include a part of CCE-mapped dynamic HARQ feedback resources reserved for the UE transmitting HARQ feedback to the BS by using PUCCH format 1a/1b, wherein each set includes two PUCCH format 1b with channel selection resources. The code in the computer program further includes a determining module 810F, for determining two PUCCH format 1b with channel selection resources based on a CCE index allocated to the UE. The code in the computer program further includes a selecting unit 810G, for selecting, from the set of PUCCH format 1b with channel selection resources indicated by the received indication and the determined two PUCCH format 1b with channel selection resources, a PUCCH format 1b with channel selection resource. The code in the computer program further includes a transmitting module 810H, for transmitting the HARQ feedback to the BS on the selected PUCCH format 1b with channel selection resource. The code in the computer program 810 may comprise further modules, illustrated as module 810I, e.g. for controlling and performing other related procedures associated with UE's operations.

The computer program modules could essentially perform the actions of the flow illustrated in FIG. 3, to emulate the arrangement 601 in the BS 600, or the actions of the flow illustrated in FIG. 5, to emulate the arrangement 701 in the UE 700. In other words, when the different computer program modules are executed in the processing unit 806, they may correspond, e.g., to the units 610-630 of FIG. 6 or to the units 710-740 of FIG. 7.

Although the code means in the embodiments disclosed above in conjunction with FIG. 8 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a Base Station (BS) for scheduling a User Equipment (UE), the method comprising:
    determining four sets of Physical Uplink Control Channel (PUCCH) format 1b with channel selection resources, which include a part of Control Channel Element (CCE)-mapped dynamic Hybrid Automatic Repeat Request (HARQ) feedback resources reserved for the UE transmitting HARQ feedback to the BS by using PUCCH format 1a/1b, each set including two PUCCH format 1b with channel selection resources,
        wherein the part of CCE-mapped dynamic HARQ feedback resources are indicated by every two adjacent CCE indices allocated to the UE, and
        wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
    selecting one of the four sets of PUCCH format 1b with channel selection resources as candidate resources, which are available for the UE transmitting HARQ feedback to the BS by using PUCCH format 1b with channel selection; and
    transmitting to the UE an indication indicating the selected one of the four sets of PUCCH format 1b with channel selection resources.

2. The method according to claim 1, wherein the four sets of PUCCH format 1b with channel selection resources further comprise HARQ feedback resources dedicated for the PUCCH format 1b with channel selection.

3. The method according to claim 1, wherein the part of the CCE-mapped dynamic HARQ feedback resources reserved for the UE transmitting HARQ feedback to the BS by using PUCCH format 1a/1b is assigned, proceeding the remaining part, to UEs, which have no HARQ feedback transmitted to the BS by using PUCCH format 1a/1b.

4. The method according to claim 1, wherein the part of the CCE-mapped dynamic HARQ feedback resources reserved for the UE transmitting HARQ feedback to the BS by using PUCCH format 1a/1b is assigned, inferior to the remaining part, to UEs, which have HARQ feedback transmitted to the BS by using PUCCH format 1a/1b.

5. A method used in a User Equipment (UE) for transmitting Hybrid Automatic Repeat Request (HARQ) feedback to a Base Station (BS) by using Physical Uplink Control Channel (PUCCH) format 1b with channel selection, the method comprising:
   receiving, from the BS, an indication indicating a set of PUCCH format 1b with channel selection resources among four sets of PUCCH format 1b with channel selection resources, which include a part of Control Channel Element (CCE)-mapped dynamic HARQ feedback resources reserved for the UE transmitting HARQ feedback to the BS by using PUCCH format 1a/1b, each set including two PUCCH format 1b with channel selection resources,
   wherein the part of CCE-mapped dynamic HARQ feedback resources are indicated by every two adjacent CCE indices allocated to the UE, and
   wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
   determining two PUCCH format 1b with channel selection resources based on a CCE index allocated to the UE;
   selecting, from the set of PUCCH format 1b with channel selection resources indicated by the received indication and the determined two PUCCH format 1b with channel selection resources, a PUCCH format 1b with channel selection resource; and
   transmitting the HARQ feedback to the BS by using the selected PUCCH format 1b with channel selection resource.

6. The method according to claim 5, wherein the four sets of PUCCH format 1b with channel selection resources further include HARQ feedback resources dedicated for the PUCCH format 1b with channel selection.

7. A Base Station (BS) configured for scheduling a User Equipment (UE), the BS comprising:
   communication circuitry configured for wirelessly communicating with the UE; and
   processing circuitry operatively associated with the communication circuitry and configured to:
      determine four sets of Physical Uplink Control Channel (PUCCH) format 1b with channel selection resources, which include a part of Control Channel Element (CCE)-mapped dynamic Hybrid Automatic Repeat Request (HARQ) feedback resources reserved for the UE transmitting HARQ feedback to the BS by using PUCCH format 1a/1b, each set including two PUCCH format 1b with channel selection resources,
      wherein the part of CCE-mapped dynamic HARQ feedback resources are indicated by every two adjacent CCE indices allocated to the UE, and
      wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
      select one of the four sets of PUCCH format 1b with channel selection resources as candidate resources, which are available for the UE transmitting HARQ feedback to the BS by using PUCCH format 1b with channel selection; and
      transmit to the UE an indication indicating the selected one of the four sets of PUCCH format 1b with channel selection resources.

8. The BS according to claim 7, wherein the four sets of PUCCH format 1b with channel selection resources further comprise HARQ feedback resources dedicated for the PUCCH format 1b with channel selection.

9. The BS according to claim 7, wherein the part of the CCE-mapped dynamic HARQ feedback resources reserved for the UE transmitting HARQ feedback to the BS by using PUCCH format 1a/1b is assigned, proceeding the remaining part, to UEs, which have no HARQ feedback transmitted to the BS by using PUCCH format 1a/1b.

10. The BS according to claim 7, wherein the part of the CCE-mapped dynamic HARQ feedback resources reserved for the UE transmitting HARQ feedback to the BS by using PUCCH format 1a/1b is assigned, inferior to the remaining part, to UEs, which have HARQ feedback transmitted to the BS by using PUCCH format 1a/1b.

11. A User Equipment (UE) for transmitting Hybrid Automatic Repeat Request (HARQ) feedback to a Base Station (BS) by using Physical Uplink Control Channel (PUCCH) format 1b with channel selection, the UE comprising:
   communication circuitry configured for wirelessly communicating with the BS; and
   processing circuitry operatively associated with the communication circuitry and configured to:
      receive, from the BS, an indication indicating a set of PUCCH format 1b with channel selection resources among four sets of PUCCH format 1b with channel selection resources, which include a part of Control Channel Element (CCE)-mapped dynamic HARQ feedback resources reserved for the UE transmitting Hybrid Automatic Repeat Request (HARQ) feedback to the BS by using PUCCH format 1a/1b, each set including two PUCCH format 1b with channel selection resources,
      wherein the part of CCE-mapped dynamic HARQ feedback resources are indicated by every two adjacent CCE indices allocated to the UE, and
      wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
      determine two PUCCH format 1b with channel selection resources based on a CCE index allocated to the UE;
      select, from the set of PUCCH format 1b with channel selection resources indicated by the received indication and the determined two PUCCH format 1b with channel selection resources, a PUCCH format 1b with channel selection resource; and transmit the HARQ feedback to the BS on the selected PUCCH format 1b with channel selection resource.

12. The UE according to claim 11, wherein the four sets of PUCCH format 1b with channel selection resources further include HARQ feedback resources dedicated for the PUCCH format 1b with channel selection.

13. A non-transitory computer-readable storage medium storing a computer program for scheduling a User Equipment (UE), the computer program product storing instructions that, when executed by processing circuitry of a Base Station (BS), cause the BS to:
  determine four sets of Physical Uplink Control CHannel (PUCCH) format 1b with channel selection resources, which include a part of Control Channel Element (CCE)-mapped dynamic Hybrid Automatic Repeat Request (HARQ) feedback resources reserved for the UE transmitting HARQ feedback to the BS by using PUCCH format 1a/1b, each set including two PUCCH format 1b with channel selection resources,
    wherein the part of CCE-mapped dynamic HARQ feedback resources are indicated by every two adjacent CCE indices allocated to the UE, and
    wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
  select one of the four sets of PUCCH format 1b with channel selection resources as candidate resources, which are available for the UE transmitting HARQ feedback to the BS by using PUCCH format 1b with channel selection; and
  transmit to the UE an indication indicating the selected one of the four sets of PUCCH format 1b with channel selection resources.

14. A non-transitory computer-readable storage medium storing a computer program for transmitting Hybrid Automatic Repeat Request (HARQ) feedback to a Base Station (BS) by using Physical Uplink Control Channel (PUCCH) format 1b with channel selection, the computer program product storing instructions that, when executed by processing circuitry of a User Equipment (UE), cause the UE to:
  receive, from the BS, an indication indicating a set of PUCCH format 1b with channel selection resources among four sets of PUCCH format 1b with channel selection resources, which include a part of Control Channel Element (CCE)-mapped dynamic HARQ feedback resources reserved for the UE transmitting Hybrid Automatic Repeat Request (HARQ) feedback to the BS by using PUCCH format 1a/1b, each set including two PUCCH format 1b with channel selection resources,
    wherein the part of CCE-mapped dynamic HARQ feedback resources are indicated by every two adjacent CCE indices allocated to the UE, and
    wherein the part of the CCE-mapped dynamic HARQ feedback resources reserved for the UE transmitting HARQ feedback to the BS by using PUCCH format 1a/1b and the remaining part are freely assigned to UEs, which have HARQ feedback transmitted to the BS by using PUCCH format 1a/1b;
  determine two PUCCH format 1b with channel selection resources based on a CCE index allocated to the UE;
  select, from the set of PUCCH format 1b with channel selection resources indicated by the received indication and the determined two PUCCH format 1b with channel selection resources, a PUCCH format 1b with channel selection resource; and
  transmit the HARQ feedback to the BS on the selected PUCCH format 1b with channel selection resource.

* * * * *